United States Patent [19]

Ikeda

[11] Patent Number: 5,745,223

[45] Date of Patent: Apr. 28, 1998

[54] IMAGE PICK-UP DEVICE CONNECTABLE TO A PAN HEAD

[75] Inventor: Keiichi Ikeda, Yokohama, Japan

[73] Assignee: Canon Kabushiki Kaisha, Tokyo, Japan

[21] Appl. No.: 524,414

[22] Filed: Sep. 6, 1995

[30] Foreign Application Priority Data

Sep. 12, 1994 [JP] Japan ................................ 6-217084

[51] Int. Cl.⁶ .................................................. H04N 5/232
[52] U.S. Cl. ........................... 356/4.01; 348/211; 348/214
[58] Field of Search ........................... 348/211, 214; 356/4.01

[56] References Cited

U.S. PATENT DOCUMENTS

4,719,485  1/1988  Shikaumi ........................ 354/400
5,079,634  1/1992  Hosono ........................... 358/210
5,450,140  9/1995  Washino ......................... 348/722
5,523,783  6/1996  Cho ................................ 348/157

*Primary Examiner*—Mark Hellner
*Attorney, Agent, or Firm*—Fitzpatrick, Cella, Harper & Scinto

[57] ABSTRACT

An image pick-up device comprises a camera unit having image pick-up means for converting an optical image to an electrical signal, a pan head unit for supporting the camera unit with an adjustable orientation and removable from the camera unit, and a connector for allowing the transmission of a control signal for the pan head from the camera unit to the pan head and status information of the pan head from the pan head to the camera unit when the image pick-up device is connected to the pan head.

20 Claims, 4 Drawing Sheets

IMAGE PICK-UP DEVICE CONNECTABLE TO A PAN HEAD

BACKGROUND OF THE INVENTION

1. Field of the Invention

The present invention relates to an image pick-up device, and more particularly to an image pick-up device having a remotely controllable pan head for changing an orientation of image pick-up.

2. Related Background Art

A video camera which can remotely control image pick-up characteristics such as zooming, iris, shutter speed or white balance by an external control signal (for example, a control command serially transferred from a computer) has been known, and a pan head for mounting a video camera and remotely control the camera (panning and tilting) by an external controlling signal has also been known. By combining such a video camera and a pan head, an image pick-up device which can computer-control the image pick-up characteristics and the image pick-up orientation may be provided.

A video camera having a pan head built therein has been known. This camera remotely controls the image pick-up characteristics and orientation by a single serial signal line.

When a remotely controllable video camera is used in combination with a remotely controllable pan head, two cables are required and the connection is complex and troublesome. Further, two output ports for the serial communication are required for a controller (for example, computer) and both of the video camera and the pan head cannot be used with a computer having only one serial output port.

In a video camera having a pan head function, such trouble is solved but the size is increased by the pan head and the space for the pan head is needed even if the pan head is not used. Namely, when only the camera unit is to be used in a narrow area, the pan head is obstructive.

SUMMARY OF THE INVENTION

It is an object of the present invention to provide an image pick-up device which can remotely control the image pick-up characteristic and orientation through a single signal line.

It is another object of the present invention to provide an image pick-up device in which a pan head is removable from a camera unit and can remotely control the image pick-up characteristic and orientation through the single signal line.

In order to achieve the above objects, according to one embodiment of the present invention, pan head connection means is provided for transmitting a control signal from the camera unit to the pan head and status information of the pan head from the pan head to the camera unit. The pan head is preferably removable from the camera unit.

By the above means, the control signal of the pan head may be transmitted from the camera unit to the pan head and the control cable need not be connected to the pan head itself. Further, since the pan head is removable from the camera unit, only the camera may be used where the pan head is obstructive.

Other objects and features of the present invention will be apparent from the following description of the preferred embodiments and the accompanying drawings.

DESCRIPTION OF THE PREFERRED EMBODIMENTS

Figure 1:
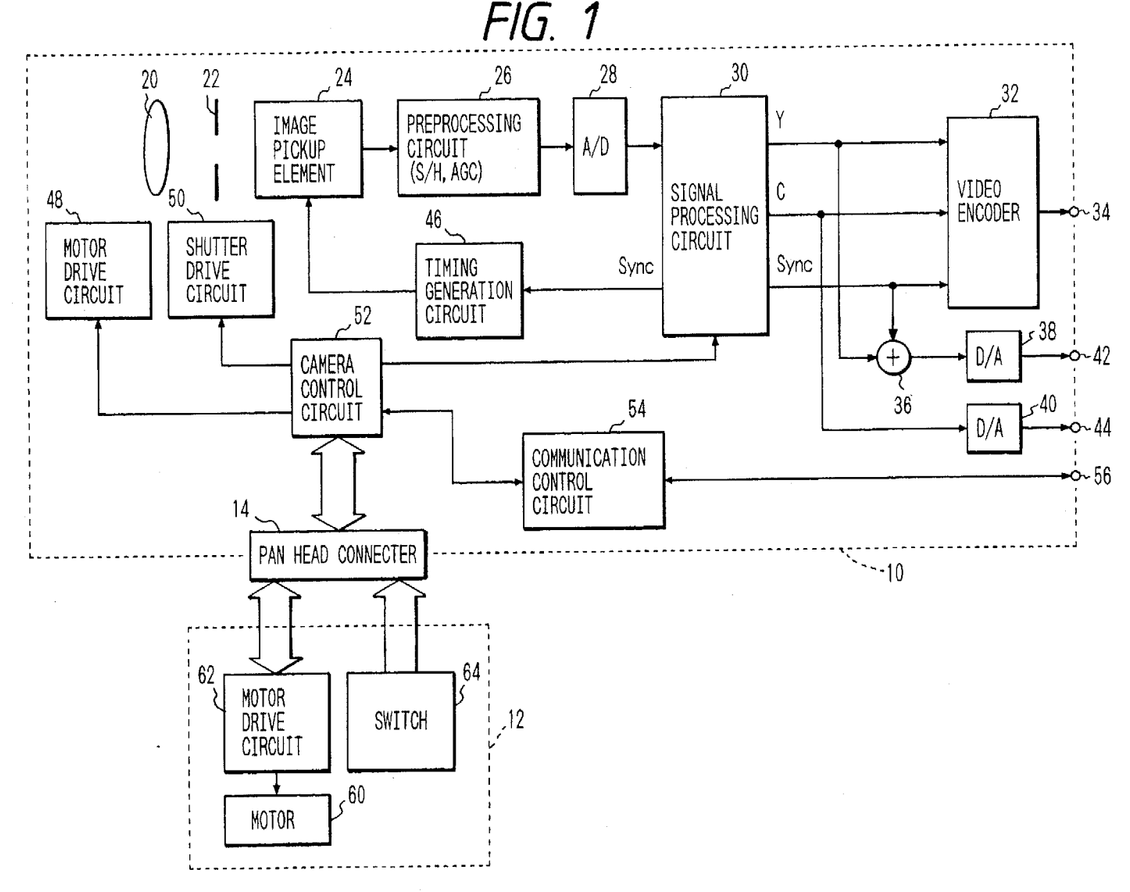
FIG. 1 shows a block diagram of a configuration of a first embodiment of the present invention.

FIG. 1 shows a block diagram of a configuration of an embodiment of the present invention. Numeral 10 denotes a video camera and numeral 12 denotes a pan head for panning an tilting the video camera 10. An internal circuit of the pan head 12 is electrically connected to an internal circuit of the video camera 10 through a pan head connector 14 of the video camera 10. The pan head connector 14 also has a power line to supply a power required for the circuit in the pan head 12 from the camera 10.

The internal structure of the video camera 10 is first explained. Numeral 20 denotes an image pick-up lens, numeral 22 denotes an iris, numeral 24 denotes an image pick-up element for converting an optical image passed through the image pick-up lens 20 and the iris 22 and focused to an imaging plane to an electrical signal, numeral 26 denotes a pre-processing circuit for sampling and holding an output of the image pick-up element 24 to adjust a gain by an AGC (automatic gain controller), numeral 28 denotes an A/D converter for converting the analog output of the pre-processing circuit 26 to a digital signal, and numeral 30 denotes a digital signal processing circuit for adjusting the color-balance of the output of the A/D converter 28, digitally processing the signals and separating a brilliance signal Y and a chrominance signal C. The signal processing circuit 30 also generates a synchronization signal to be superimposed on the output video signal.

Numeral 32 denotes a video encoder for generating a composite video signal in accordance with the brilliance signal Y, the chrominance signal C and the synchronization signal outputted from the signal processing circuit 30 and numeral 34 denotes a video output terminal for outputting the output signal of the video encoder 32.

Numeral 36 denotes an adder for superimposing the synchronization signal outputted from the signal processing circuit 30 to the brilliance signal Y outputted from the signal processing circuit 30, numeral 38 denotes a D/A converter for converting the output of the adder 36 to an analog signal, numeral 40 denotes a D/A converter for converting the chrominance circuit outputted from the signal processing circuit 30 to an analog signal, and numerals 42 and 44 denote video terminals for outputting the outputs of the D/A converters 38 and 40, respectively.

Numeral 46 denotes a timing generation circuit for generating various timing signals for the image pick-up element 24 in accordance with the synchronization signal from the signal processing circuit 30.

Numeral 48 denotes a motor drive circuit for driving a zooming motor for the image pick-up lens 20, a focusing motor and a motor for the iris 22, numeral 50 denotes a shutter drive circuit for driving the shutter, and numeral 52 denotes a camera control circuit for controlling the signal processing circuit 30 (specifically the white balance adjustment and the gain adjustment by the circuit 30), the motor drive circuit 48 (zooming, focusing and iris) and the shutter drive circuit 50 (shutter speed) and controlling the pan head 12 to be connected through the pan head connector 14 in accordance with the external control signals.

Numeral 54 denotes a communication control circuit for controlling the communication with the external equipment (for example, computer) connected to the control terminal 56. It transfers the control command and data from the external equipment to the camera control circuit 52 and transfers the status information and data from the camera control circuit 52 to the external equipment.

The internal construction of the pan head 12 is explained. Numeral 60 denotes a motor for panning and tilting the camera 10, numeral 62 denotes a motor drive circuit for driving the motor 60, and numeral 64 denotes a switch for detecting states of the pan/tilt mechanism of the pan head 12. The camera control circuit 52 collects the output of the switch 64 through the pan head connector 14 and controls the motor drive circuit 62 in accordance with the external control signal.

A basic operation in the video camera 10 is first explained. An optical image of an object passes through the image pick-up lens 20, the iris 22 and the shutter, not shown, and is focused on the imaging plane of the image pick-up element 24 which outputs an electrical signal of the optical image of the object in accordance with the timing signal from the timing generation circuit 46. The pre-processing circuit 26 samples and holds the output of the image pick-up element 24, controls the gain by the AGC and applies it to the A/D converter 28. The A/D converter 28 converts the analog output of the pre-processing circuit 26 to a digital signal. The digital signal processing circuit 30 adjusts the color balance of the output data of the A/D converter 28 by the initial condition or a condition set by the camera control circuit 52, and generates brilliance data and chrominance data by the digital signal processing in accordance with the color filter of the image pick-up element 24.

The video encoder 32 generates the composite video signal by a known circuit from the brilliance signal, the chrominance signal and the synchronization signal outputted from the signal processing circuit 30 and outputs it to the video output terminal 34. The adder 36 combines the brilliance signal outputted from the signal processing circuit 30 with the synchronization signal outputted from the signal processing circuit 30 and the output thereof is converted to an analog signal by the D/A converter 38 and it is outputted from the output terminal 42. The D/A converter 40 converts the chrominance data outputted from the signal processing circuit 30 to an analog signal which is outputted from the output terminal 44. The video outputs at the output terminals 42 and 44 are so-called S outputs.

A computer for controlling the video camera 10 and the pan head 12 is connected to the control terminal 56 and the communication control circuit 54 controls the communication with the computer. Specifically, the communication control circuit 54 receives the control commands for the camera 10 and the pan head 12, transfers them to the camera control circuit 52 and transmits the status information of the camera 10 and the pan head 12 which are supplied from the camera control circuit 52 to the computer.

Detail of the camera control circuit 52 is described later. When the camera control circuit 52 receives the control command from the communication control circuit 54, it controls the signal processing circuit 30 (white balance and gain), the motor drive circuit 48 (zooming, focusing and iris) and the shutter drive circuit 50 (shutter speed) in accordance with the control target and the content and controls the pan head 12 connected through the pan head connector 14. The camera control circuit 52 also outputs the control result and the search result for the inquiry to the communication control circuit 54 as the status information.

Figure 2:
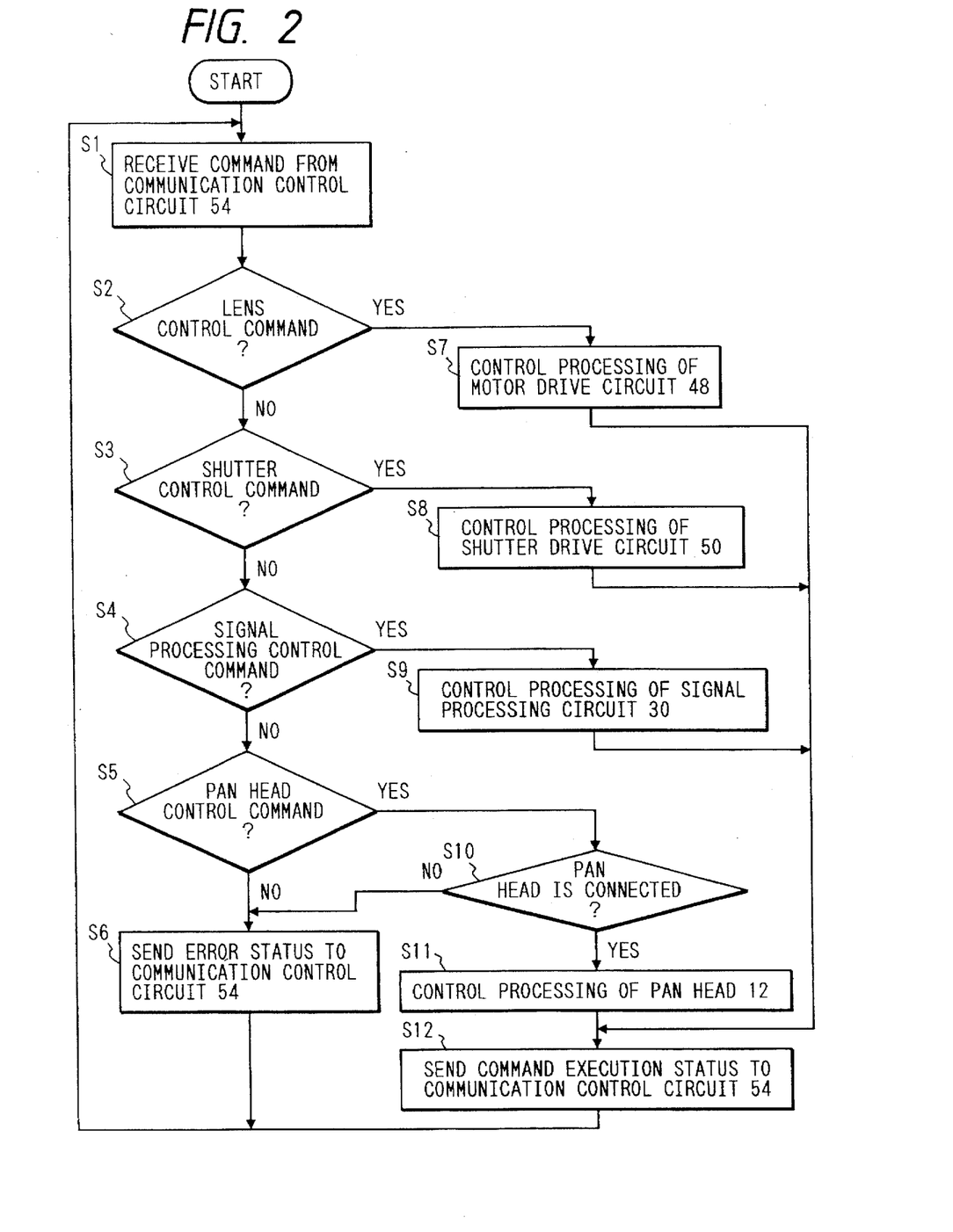
FIG. 2 shows an operational flow chart of a camera control circuit 52.

Referring to FIG. 2, a detailed operation of the camera control circuit 52 is explained. FIG. 2 shows a flow chart of the operation of the camera control circuit 52. When the camera control circuit 52 receives a command from the communication control circuit 54, it determined whether the command is a lens control command, a shutter control command, a signal processing control command or a pan head control command (S2–S5), and if it is none of them, it returns an error status signal to the communication control circuit 54 indicating that the command is invalid.(S6).

If the command from the communication control circuit 54 is the lens control command (S2), the camera control circuit 52 controls the zooming, the focusing or the iris by the motor control circuit 48 in accordance with the content of the command (S7). Then, the camera control circuit 52 returns the command execution status signal to the communication control circuit 54 (S12).

When the command from the communication control circuit 54 is the shutter control command (S3), the camera control circuit 52 controls the shutter speed by the shutter drive circuit in accordance with the content of the command (S8). Then, the camera control circuit 52 returns the command execution status signal to the communication control circuit 54 (S12).

When the command from the communication control circuit 54 is the signal processing control command (S4), the camera control circuit 52 commands the signal processing circuit 30 to control the white balance, the gamma characteristic and the signal gain in accordance with the content of the command (S8). Then, the camera control circuit 52 returns the command execution status signal to the communication control circuit 54 (S12).

When the command from the communication control circuit 54 is the pan head control command (S5), the camera control circuit 52 determines whether the pan head 12 is connected or not by detecting the state of the switch 64 (S10), and if the pan head 12 is not connected (S10), it returns the error status signal to the communication control circuit 54 (S6), and if the pan head 12 is connected (S10), it controls the motor drive circuit 62 for the pan head 12 in accordance with the content of the command (S1). Then, it returns the command execution status signal to the communication control circuit 54 (S12).

The camera control circuit 52 returns to S1 after S6 or S12 and repeats the above process.

Figure 3:
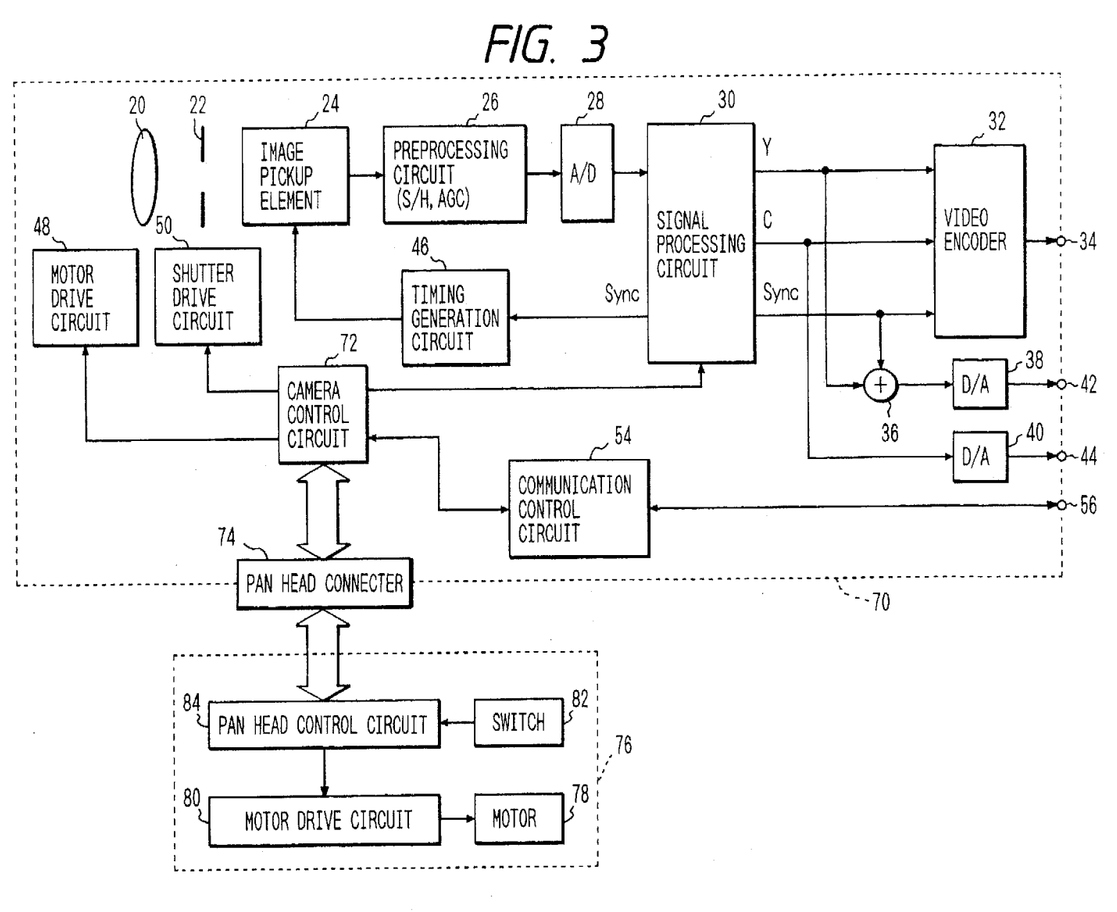
FIG. 3 shows a block diagram of a configuration of a second embodiment of the present invention.

In the embodiment shown in FIG. 1, the camera control circuit 52 of the camera 10 directly controls the motor control circuit 62 of the pan head 12. Alternatively, a pan head control circuit for controlling the mechanism and state of the pan head, for example, the motor drive circuit 62 and the switch may be provided in the pan head. This can simplify the pan head connector 14. FIG. 3 shows a block diagram of a configuration of such modified embodiment. The like elements to those shown in FIG. 1 are designated by the like numerals. In a video camera 70, a camera control circuit 72 differs from the camera control circuit 52 in the function of the pan head control and a pan head connector differs from the pan head connector 14 in the number of signals exchanged with the pan head 76 and the characteristic thereof. The pan head 76 has a motor 78 for panning and tilting the camera 70, a motor drive circuit 80 for driving the motor 78 and a switch 82 for detecting states of the pan tilt mechanism of the pan head 76, as does the pan head 12, and further has a pan head control circuit 84 for exchanging the control/status signal with the camera control circuit 72 to monitor the state of the switch 82 and controlling the motor drive circuit 80.

The camera control circuit 52 of the embodiment shown in FIG. 1 generates the control signal for the motor drive circuit 62 for the external pan head control command in accordance with the content thereof. The camera control circuit 72 of the embodiment shown in FIG. 3 merely exchanges the command/status signal with the pan head 76 (the pan head control circuit 84 thereof) and the pan head control circuit 84 monitors the states of the pan heads (specifically the switch 82) to directly control the motor drive circuit 76.

By the present arrangement, various pan heads having different pan/tilt mechanisms may be connected to the camera 70. Specifically, the camera control circuit 72 is not affected by the difference of the gear ratio of the pan/tilt mechanism and the construction of the switch 80 and a displacement amount by an angular degree may be commanded to the pan head control circuit 84 by a parameter value. Further, the number of signals through the pan head connector 74 is reduced and the current magnitude is also reduced so that the pan head connector 74 may be manufactured more economically than the pan head connector 14.

Figure 4:
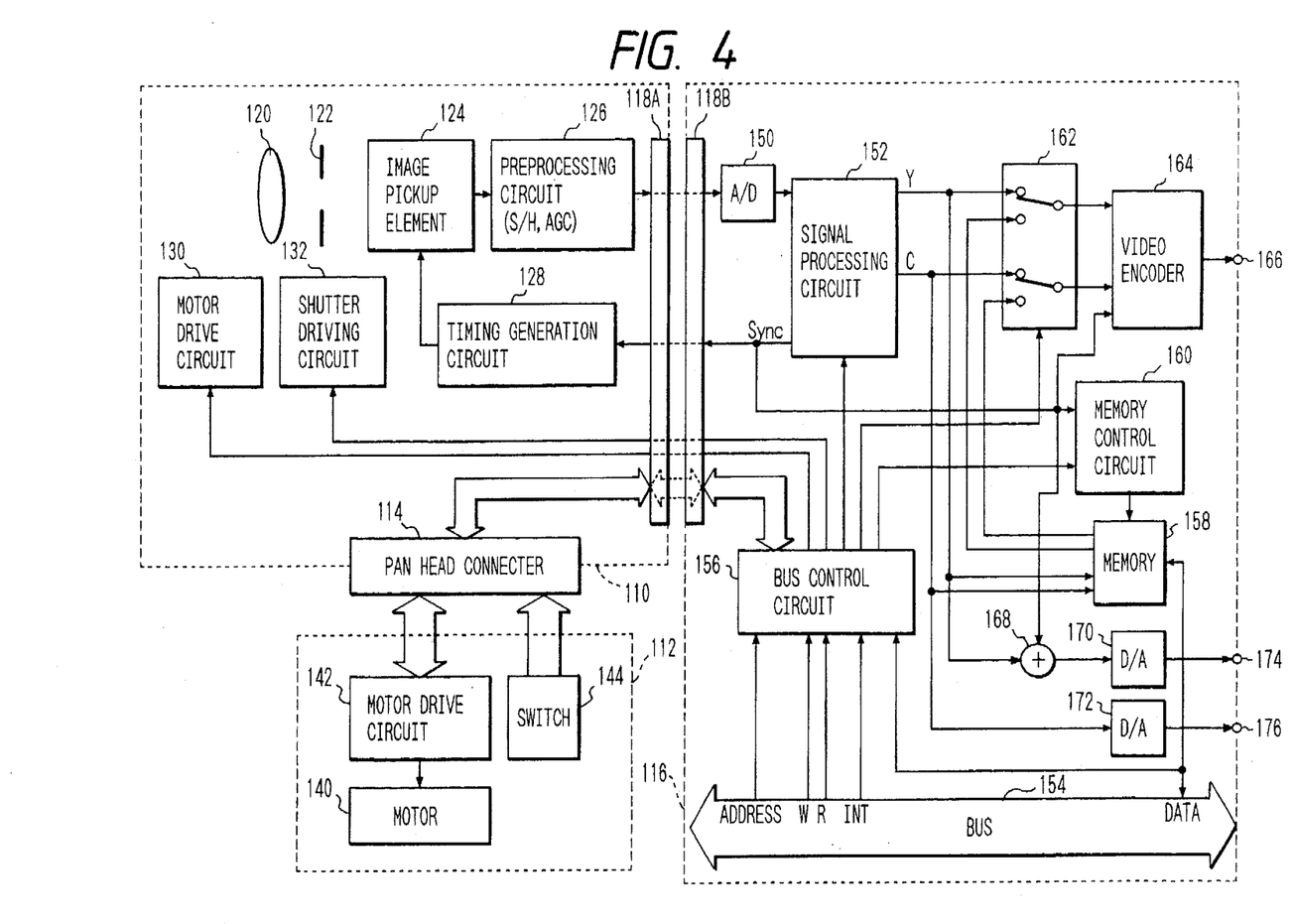
FIG. 4 shows a block diagram of a third embodiment of the present invention.

FIG. 4 shows a modification of the embodiment shown in FIG. 1 and shows a block diagram of a configuration of a third embodiment which is suitable for the connection to the computer. In the embodiment shown in FIG. 4, the camera is divided into an image pick-up unit and a processing unit for the image pickup signal by the image pick-up unit and the processing unit is constructed as an expansion board of the computer.

A configuration of the embodiment of FIG. 4 is explained. Numeral 110 denotes an image pick-up head unit which is the image pick-up unit, numeral 112 denotes a pan head unit connected to the pan head connector 114 of the image pick-up head unit 110 for supporting the image pick-up head unit 110 and panning and tilting the unit 110 and numeral 116 denotes a processing unit for processing the image pick-up signal of the image pick-up head unit 110. The image pick-up head unit 110 and the processing unit 116 are interconnected by the connection by a connector 118A of the image pick-up unit 110 and a connector 118B of the processing unit 116 through a cable, not shown.

A configuration of the image pick-up head unit 110 is explained. Numeral 120 denotes an image pick-up lens, numeral 122 denotes an iris, numeral 124 denotes an image pick-up element for converting an optical image passed through the image pick-up lens 120 and the iris 122 and focused on the imaging plane to an electrical signal, and numeral 126 denotes a pre-processing circuit for sampling and holding the output of the image pick-up elements 24 and adjusting the gain by the AGC (automatic gain control). Numeral 128 denotes a timing generation circuit for generating various timing signals for the image pick-up element 24. Numeral 130 denotes a motor drive circuit for driving a zooming motor for the image pick-up lens 120, a focusing motor and a motor for the iris 122, and numeral 132 denotes a shutter drive circuit for driving the shutter.

An internal configuration of the pan head unit 112 is explained. Numeral 140 denotes a motor for panning and tilting the camera image pick-up unit 110, numeral 142 denotes a motor drive circuit for driving the motor 140, and numeral 144 denotes a switch for detecting states of the pan/tilt mechanism of the pan head unit 112.

An internal configuration of the processing unit 116 is explained. Numeral 150 denotes an A/D converter for converting the analog output of the pre-processing circuit 110 of the image pick-up head unit 110 to a digital signal, and numeral 152 denotes a digital signal processing circuit for conducting the color balance adjustment and other digital processing to the output of the A/D converter 150 and separating the brilliance signal Y and the chrominance signal C. The signal processing circuit 152 also generates and outputs a horizontal synchronization signal which is a reference to the operation in the peripheral circuit.

Numeral 154 denotes a computer bus which is directly connected to a bus of the computer (not shown) and it may confirm to the standard of ISA bus, VL bus, NUBUS or PCMCIA (which are trademarks of the corresponding manufactures or dealers). The bus 154 comprises an address bus, a data bus, an interrupt bus, a clock, a read signal line, a write signal line, a power line and a ground line.

Numeral 156 denotes a bus control circuit for controlling in accordance with addresses and data on the bus 154. The bus control circuit 156 functions as the camera control circuit 52 of the embodiment of FIG. 1.

Numeral 158 denotes a memory for storing an image from the computer or an image picked up by the image pick-up unit 110 and numeral 160 denotes a memory control circuit for controlling the memory 158.

Numeral 162 denotes a selector for selecting the video data outputted from the signal processing circuit 152 or the video data read from the memory 158, numeral 164 denotes a video encoder for generating a composite video signal from the video data selected by the selector 162, and numeral 166 denotes a composite video output terminal for outputting the output signal of the video encoder 164.

Numeral 168 denotes an adder for superimposing the synchronization signal outputted from the signal processing circuit 152 to the brilliance signal Y outputted from the signal processing circuit 152, numeral 170 denotes a D/A converter for converting the output of the adder 168 to an analog signal, numeral 172 denotes a D/A converter for converting the chrominance signal C outputted from the signal processing circuit 152 to an analog signal, and numerals 174 and 176 denote video output terminals for outputting the outputs of the D/A converters 170 and 172, respectively.

The output of the pre-processing circuit 126 is inputted to the D/A converter 150 through the connectors 118A and 118B, and the horizontal/vertical synchronization signals outputted by the signal processing circuit 152 are applied to the timing generation circuit 128 through the connectors 118B and 118A. The bus control circuit 156 controls the motor drive circuit 130 and the shutter drive circuit 132 through the connectors 118B and 118A, controls the motor drive circuit 142 of the pan head unit 112 through the connectors 118B and 118A and the pan head connector 114, and monitors the state of the switch 144.

The output of the signal processing circuit 152 is applied to the memory 158 which stores the output data of the signal processing circuit 152, that is, the picked-up image data under the control of the memory control circuit 160. The input/output port of the memory 158 is also connected to the data bus of the computer bus 154 and reads the data stored in the memory 158 into the computer and writes the data from the computer into the memory 158.

The selector 162 selects whether the composite video signal of the image stored in the memory 158 is to be outputted or the composite video signal of the picked-up image is to be outputted.

The bus control circuit 156 reads in the data on the data bus when it is designated by the address bus of the computer bus 154 and conducts the controls in accordance with the content thereof.

An operation of the embodiment shown in FIG. 4 is specifically explained. A flow of the signal of the picked-up image is first explained. An optical image of the object passes through the image pick-up lens 120, the iris 122 and the shutter, not shown, and is focused on the imaging plane of the image pick-up element 124 which outputs an electrical signal of the optical image of the object in accordance with the timing signal from the timing generation circuit 128. The pre-processing circuit 126 samples and holds the output of the image pick-up element 124 and controls the gain by the AGC, and the output thereof is applied to the A/D converter 150 through the connectors 118A and 118B. The A/D converter 150 converts the analog output of the pre-processing circuit 126 to a digital signal. The digital signal processing circuit 152 adjusts the color balance of the output data of the A/D converter 150 by the condition defined by the initial condition or the bus control circuit 156, and generates the brilliance signal and the chrominance data by the digital signal processing in accordance with the color filter of the image pick-up element 124. The brilliance data output of the signal processing circuit 152 is applied to the selector 162, the memory 158 and the adder 168 and the chrominance data output is applied to the selector 162, the memory 158 and the D/A converter 172.

The bus control circuit 156 controls the memory control circuit 160 in accordance with the command from the computer, not shown, to write one frame of a pick-up image into the memory 158. The bus control circuit 156 further controls the memory control circuit 160 to read the image data stored in the memory 158 into the selector 162 and the computer bus 154. The selector 162 is controlled by the bus control circuit 156 to select the output data of the signal processing circuit 152 or the data from the memory 158 and applies it to the video encoder 164. The video encoder 164 generates the composite video signal by a known process from the brilliance data and the chrominance data outputted from the selector 162 and outputs it to the video output terminal 166.

The adder 168 combines the brilliance signal outputted from the signal processing circuit 152 with the synchronization signal outputted from the circuit 152 and the output thereof is converted to an analog signal by the D/A converter 170 and outputted from the output terminal 174. The D/A converter 172 converts the chrominance data outputted from the signal processing circuit 152 to an analog signal and the output thereof is outputted from the output terminal 176. The video outputs at the output terminals 174 and 176 are so-called S outputs.

The control of the image pick-up characteristic and orientation, and the exchange of data with the computer are explained. In the present embodiment, a specific address of an address space of the computer is assigned to the transfer of the command and data between the main CPU of the computer and the processing unit 116. The specific address may be changed by a dip switch, not shown. In the present embodiment, it is assumed that it is assigned to 2000H. Application software operating on the computer writes a command at the address 2000H. The bus control circuit 156 monitors the writing of data into the address 2000H and if it detects the writing of data at the address 2000H, it reads the data at the address 2000H and controls the motor drive circuit 130, the shutter drive circuit 132, the pan head unit 112, the signal processing circuit 152 and the memory control circuit 160 in accordance with the content of the read data.

The bus control circuit 156 further continuously monitors the state of the switch 144 of the pan head unit 112 and also monitors the state of the image pickup head unit 110 so that the connection or disconnection of the image pick-up unit 110 and the pan head unit 112 can always be detected.

An operation to another command is explained. When the command from the application software is to write the picked-up image data into the memory 158, the bus control circuit 156 commands to the memory control circuit 160 to write one frame of video data into the memory 158. The writing of the video data is, of course, conducted in synchronism with the horizontal/vertical synchronization signals.

For a command to read the video data from the memory 158 into the main CPU, the bus control circuit 156 causes the memory control circuit 160 to sequentially read the data stored in the memory 158 and writes the data at the address 2000H through the computer bus 154. The application software reads the data from the memory via the address 2000H. By a reverse operation, any data may be written from the computer into the memory 158.

When the command received from the computer bus 154 relates to the control of the image pick-up head unit 110 (for example, zooming, focusing, iris or shutter speed), the bus control circuit 156 controls the motor drive circuit 130 and the shutter drive circuit 132 through the connectors 118B and 118A in accordance with the content of the control target. When the command received from the computer bus 154 relates to the control of the pan head unit 112 (panning or tilting), the bus control circuit 156 controls the motor drive circuit 142 through the connectors 118B and 118A and the pan head connector 114 in accordance with the content of the control target and detects the state of the switch 144. The bus control circuit 156 sends the control results to the main CPU as the status. When the pan head is not connected, it is sent to the main CPU as the status.

When the bus control circuit 156 has the status signal to be sent to the main CPU, it interrupts the main CPU through the interrupt line of the computer bus 154 and sends the status information to the main CPU.

In this manner, the application software operating on the computer writes the command at the specified address and reads the data from the specified address to control the embodiment shown in FIG. 4. The information exchanged between the application software and the processing unit 116 includes parameters necessary for the controls.

In the embodiment shown in FIG. 4, the bus control circuit 156 has a status register therein to which a result of execution of a command (response status) is set. The status information set in the status register is read at a predetermined timing and written into the specified address through the computer bus 154. In this manner, the status signal is transmitted to the main CPU. When the command is the inquiry as to the status and function of the equipment, the response to the inquiry is set in the status register and transferred to the specified address in the manner described above so that the status and function of the connected equipment, that is, the image pick-up head unit 110, the pan head unit 112 and the processing unit 116 are transmitted to the main CPU.

In accordance with the present invention, the connection cable for only the control of the pan head is not necessary and the connection with the external equipment is simplified. Further, since the pan head or the pan head unit may be removed to allow the operation by only the camera unit, it may be installed in a narrow space.

What is claimed is:

1. An image pick-up device comprising:

(a) a camera unit having image pick-up means for converting an optical image to an electrical signal;

(b) a pan head unit for supporting said camera unit with an adjustable orientation; and (c) pan head connection means for connecting said camera unit to said pan head unit, and for transmitting, through said pan head connection means, a control signal of said pan head unit from said camera unit to said pan head unit and status information of said pan head unit from said pan head unit to said camera unit.

2. An image pick-up device according to claim 1, wherein said pan head unit is detachable from said camera unit.

3. An image pick-up device according to claim 1, wherein said camera unit includes camera control means for controlling the image pick-up characteristic and orientation in accordance with an external control signal.

4. An image pick-up device according to claim 3, wherein said camera unit includes communication means for receiving an external control signal and outputting predetermined information, said communication means supplying the received control signal to said camera control means as the external control signal.

5. An image pick-up device according to claim 3, wherein said camera control means comprises bus control means connected to a bus for controlling said camera unit in accordance with a signal on the bus.

6. An image pick-up device according to claim 3, wherein said pan head unit includes pan head control means for controlling said pan head unit under the control of said camera control means.

7. An image pick-up device according to claim 1, wherein said camera unit includes an image pick-up unit having said image pick-up means and a signal processing unit for processing a signal of the picked-up image by said image pick-up unit, and wherein said image pick-up unit and said processing unit are electrically connected by electrical connection means.

8. An image pick-up device according to claim 7, wherein said camera unit includes camera control means for controlling the image pick-up characteristic and orientation in accordance with an external signal.

9. An image pick-up device according to claim 8, wherein said camera control means controls the image pick-up characteristic of said image pick-up unit through said electrical connection means and controls said pan head unit through said electrical connection means and said pan head connection means.

10. An image pick-up device comprising:

(a) a camera unit having image pick-up means for converting an optical image to an electrical signal;

(b) a pan head unit for supporting said camera unit with an adjustable orientation; and (c) pan head connection means for coupling said camera unit to said pan head unit, and for electrically connecting, through said pan head connection means, an internal circuit of said camera unit and an internal circuit of said pan head unit.

11. An image pick-up device according to claim 10, wherein said pan head unit is removable from said camera unit.

12. An image pick-up device connectable to a pan head comprising:

(a) a camera unit having image pick-up means for converting an optical image to an electrical signal; and (b) first connection means for connecting said camera unit to the pan head, and for allowing the transmission of a pan head control signal from said camera unit to said pan head and status information of said pan head from said pan head to said camera unit when said image pick-up device is connected to said pan head.

13. An image pick-up device according to claim 12, wherein said camera unit includes camera control means for controlling the image pick-up characteristic and orientation in accordance with an external control signal.

14. An image pick-up device according to claim 13, wherein said camera unit includes communication means for receiving an external control signal and outputting predetermined information, said communication means supplying the received control signal to said camera control means as the external control signal.

15. An image pick-up device according to claim 13, wherein said camera control means comprises bus control means connected to a bus for controlling in accordance with a signal on the bus.

16. An image pick-up device according to claim 12, wherein said camera unit includes an image pick-up unit having said image pick-up means and a processing unit for processing a signal of the picked-up image by said image pick-up unit, and wherein said image pick-up unit and said processing unit are electrically connected by electrical connection means.

17. An image pick-up device according to claim 16, wherein said camera unit includes camera control means for controlling the image pick-up characteristic and orientation in accordance with an external control signal.

18. An image pick-up device according to claim 17, wherein said camera control means controls the image pick-up characteristic of said image pick-up unit through a second connection means, and control said pan head through said first and second connection means.

19. A pan head connectable to an image pick-up device comprising:

(a) a pan head unit for supporting the image pick-up device with an adjustable orientation; and (b) connection means for coupling said pan head to the image pick-up device, and for allowing the transmission through said connection means, of a pan control signal from said image pick-up device to said pan head and status information of said pan head from said pan head to said image pick-up device when said image pick-up device is connected to said pan head.

20. A pan head according to claim 19, further comprising pan head control means for controlling said pan head.

* * * * *

UNITED STATES PATENT AND TRADEMARK OFFICE
CERTIFICATE OF CORRECTION

PATENT NO. : 5,745,223
DATED : April 28, 1998
INVENTOR(S) : KEIICHI IKEDA

It is certified that error appears in the above-identified patent and that said Letters Patent is hereby corrected as shown below:

Column 1

Line 16, "control" should read --controlling--.

Column 2

Line 13, "an" should read --and--.

Column 4

Line 5, "determined" should read --determines--.
　　　Line 10, "invalid." should read --invalid--.
　　　Line 41, "command (S1)." should read
--command (S11).--.

Column 10

Line 41, "control" should read --controls--.

Signed and Sealed this

Twenty-fourth Day of November, 1998

Attest:

BRUCE LEHMAN

Attesting Officer　　　Commissioner of Patents and Trademarks